United States Patent
Krause et al.

(10) Patent No.: US 12,329,338 B2
(45) Date of Patent: Jun. 17, 2025

(54) SCRUBBER

(71) Applicant: SCRUB DADDY, INC., Pennsauken, NJ (US)

(72) Inventors: Aaron C. Krause, Voorhees, NJ (US); John O'Brien, Folcroft, PA (US)

(73) Assignee: Scrub Daddy, Inc., Pennsauken, NJ (US)

(*) Notice: Subject to any disclaimer, the term of this patent is extended or adjusted under 35 U.S.C. 154(b) by 559 days.

(21) Appl. No.: 17/521,054

(22) Filed: Nov. 8, 2021

(65) Prior Publication Data

US 2022/0142446 A1 May 12, 2022

Related U.S. Application Data

(60) Provisional application No. 63/111,299, filed on Nov. 9, 2020.

(51) Int. Cl.
*A47L 13/16* (2006.01)
*B32B 5/18* (2006.01)
(Continued)

(52) U.S. Cl.
CPC ........... *A47L 13/16* (2013.01); *B32B 5/18* (2013.01); *B32B 5/245* (2013.01); *B32B 5/32* (2013.01);
(Continued)

(58) Field of Classification Search
CPC ......... A47L 13/16; C08G 18/42; C08G 18/48; C08G 18/7671; C08G 2110/0008; C08G 2110/0025; C08J 2375/04; C08J 2375/06; C08J 2461/28; C08J 2475/06; C08J 2479/02; C08J 9/236; C08J 9/33;
(Continued)

(56) References Cited

U.S. PATENT DOCUMENTS

2009/0247658 A1* 10/2009 Kobayashi ............... D01F 6/70
521/159
2010/0212690 A1* 8/2010 Linden ............... A47L 11/4038
15/98
2015/0037564 A1* 2/2015 Johnstone ............... B32B 5/024
428/317.9

FOREIGN PATENT DOCUMENTS

EP          3017744 A1 * 5/2016
JP       2003160687 A  * 6/2003
JP       2004067839 A  * 3/2004

OTHER PUBLICATIONS

Translation of JP-2003160687-A, Fukuyama et al., Jun. 3, 2003. (Year: 2003).*

(Continued)

*Primary Examiner* — Hai Vo
(74) *Attorney, Agent, or Firm* — Emmett S. Collazo; Jonathan M. Waldman (57) ABSTRACT

A scrubber and methods of forming a scrubber. The scrubber may include a foamed melamine resin, a first foamed polyurethane resin, a second foamed polyurethane resin, and a binder. The scrubber can be configured to exhibit the properties of both a scrubber and an eraser, and have a density ranging from 0.01 to 0.5 grams per $cm^3$. A method of forming the scrubber may include the following steps: mixing foamed melamine resin particles, first foamed polyurethane resin particles, and second foamed polyurethane resin particles to form a first mixture; and mixing the first mixture with a binder to form a second mixture.

16 Claims, 3 Drawing Sheets

(51) Int. Cl.
　　　*B32B 5/24*　　　(2006.01)
　　　*B32B 5/32*　　　(2006.01)
　　　*C08J 9/236*　　(2006.01)
　　　*C08J 9/35*　　　(2006.01)
　　　*C08L 75/04*　　(2006.01)

(52) U.S. Cl.
　　　CPC ......... *C08J 9/236* (2013.01); *C08J 9/35* (2013.01); *C08L 75/04* (2013.01); *B32B 2264/0292* (2013.01); *B32B 2264/12* (2013.01); *B32B 2264/2031* (2020.08); *B32B 2264/303* (2020.08); *B32B 2264/308* (2020.08); *B32B 2266/0278* (2013.01); *B32B 2266/0285* (2013.01); *B32B 2432/00* (2013.01); *C08J 2375/04* (2013.01); *C08J 2475/06* (2013.01); *C08J 2479/02* (2013.01); *C08L 2203/14* (2013.01); *C08L 2205/025* (2013.01); *C08L 2205/035* (2013.01)

(58) Field of Classification Search
　　　CPC ... C08J 9/35; C08L 2203/14; C08L 2205/025; C08L 2205/035; C08L 61/28; C08L 75/04; B32B 5/18; B32B 5/245; B32B 5/32; B32B 2264/0292; B32B 2264/12; B32B 2264/2031; B32B 2264/308; B32B 2266/0278; B32B 2266/0285; B32B 2432/00
　　　See application file for complete search history.

(56)　　　References Cited

OTHER PUBLICATIONS

Translation of JP-2004067839-A, Abe et al., Mar. 4, 2004. (Year: 2004).*

* cited by examiner

SCRUBBER

CROSS REFERENCE TO RELATED APPLICATIONS

The present application claims priority to provisional application No. 63/111,299 filed on Nov. 9, 2020 and the subject matter of provisional application No. 63/111,299 is incorporated by reference herein in its entirety.

FIELD OF THE INVENTION

The present application is directed to a scrubber made of foamed resin which has the properties of both a scrubber and an eraser, and methods of forming such a scrubber.

BACKGROUND OF THE INVENTION

The present invention is directed toward a multi-function scrubber with enhanced and synergistic characteristics and a method of making such scrubber.

There are various types of scrubbers on the market for removing unwanted food and other residues from surfaces. In order to remove a small amount of material, what has been marketed by Procter and Gamble as a "Magic Eraser", is designed to be wet and to remove light scuffs and other deposits from walls, counters, etc. On the other extreme, in order to remove larger amounts of material, other scrubbing utensils have been manufactured, such as scrubbers sold under the Scrub Daddy and the Scotch brands. One of the disadvantages of the "Magic Eraser" types of materials is that their cohesive strength is very low and when trying to remove deposits from rough surfaces, a lot of the "Magic Eraser" falls off in pieces which reduces the longevity of the product and creates pieces of material that has to be cleaned up and/or removed. While the other scrubbing utensils are more robust on rough surfaces, they are not appropriate to remove just a small amount of material and may end up scuffing the surface that is being cleaned.

Accordingly, depending on which type of deposit is being removed requires a different kind of scrubbing utensil. The present invention addresses all of those needs by providing a multi-use scrubber with enhanced properties as well as cohesive strength.

SUMMARY OF THE INVENTION

In an embodiment of the present invention, a scrubber may include a foamed melamine resin, a first foamed polyurethane resin, a second foamed polyurethane resin, and a binder. The foamed melamine resin is preferably melamine formaldehyde resin and the second foamed polyurethane resin preferably has greater stiffness than the first foamed polyurethane resin. The first foamed polyurethane resin is preferably a polyester urethane resin and the second foamed polyurethane resin is preferably a polyester urethane resin and the binder is preferably a urethane binder. The urethane binder may be methylene diphenyl diisocyanate or methylene diphenyl diisocyanate in combination with a polyester polyol. Also, the scrubber may have an average density of 0.1-0.5 g/cm$^3$.

In yet another aspect of the invention, the foamed melamine resin, the first foamed polyurethane resin, and the second foamed polyurethane resin may be foamed melamine resin particles, first foamed polyurethane resin particles, and second foamed polyurethane resin particles, respectively. An amount of the foamed melamine resin may be 5-25% by weight of the scrubber, an amount of the first foamed polyurethane resin may be 15-70% by weight of the scrubber, an amount of the second foamed polyurethane resin may be 5-25% by weight of the scrubber, and an amount of the binder may be 20-60% by weight of the scrubber. The average particle size of the foamed melamine resin particles may be 1-20 millimeters, an average particle size of the second foamed polyurethane resin particles may be 0.1-15 millimeters, and an average particle size of the first foamed polyurethane resin particles may be 0.1-15 millimeters. The average aspect ratio of the foamed melamine resin particles, the first foamed polyurethane resin particles, and the second foamed polyurethane resin particles may be in a range from 1:1 to 5:1.

In another aspect of the invention, the scrubber further includes a polyurethane foam laminate. The polyurethane foam laminate may include the same materials as the first and/or the second foamed polyurethane resin.

In yet another aspect of the invention, the foamed melamine resin particles, the first foamed polyurethane resin particles, and the second foamed polyurethane resin particles may be distributed in the scrubber in such a way that the relative particles per unit area of each of the foamed melamine resin particles, the first foamed polyurethane resin particles, and the second foamed polyurethane resin particles does not vary by more than twenty five percent from a first volume to a second volume of the scrubber, wherein the first volume encompasses twenty five percent of the scrubber and the second volume encompasses a different twenty five percent of the scrubber. Also, the second foamed polyurethane resin may, have a stiffness which may be 10% to 500% higher than the stiffness of the first foamed polyurethane resin and the foamed melamine resin.

In yet another aspect of the invention, the scrubber can be formed by mixing foamed melamine resin particles, first foamed polyurethane resin particles, and second foamed polyurethane resin particles to form a first mixture and mixing the first mixture with a binder to form a second mixture. The method may further include compressing the second mixture to achieve an average density of 0.01-0.5 grams/cm$^3$. An amount of the foamed melamine resin particles may be 5-25% by weight of the scrubber, an amount of the first foamed polyurethane resin particles may be 15-70% by weight of the scrubber, an amount of the second foamed polyurethane resin particles may be 5-25% by weight of the scrubber, and an amount of the binder may be 20-60% by weight of the scrubber. An average particle size of the melamine-based resin particles may be 1-20 millimeters, an average particle size of the second polyurethane resin particles may be 0.1-15 millimeters, and an average particle size of the first polyurethane resin particles may be 0.1-15 millimeters. Further, an average aspect ratio of the foamed melamine resin particles, the first foamed polyurethane resin particles, and the second foamed polyurethane resin particles may be in a range from 1:1 to 5:1.

In yet another aspect of the invention, the scrubber may be configured to exhibit the properties of both a scrubber and an eraser, and may include a foamed melamine resin, a first foamed polyurethane resin, a second foamed polyurethane resin and a binder, and the scrubber may have a density ranging from 0.01 to 0.5 grams per cm$^3$. The scrubber may have a tensile strength ranging from 10-35 psi. The foamed melamine resin may have a different rigidity at different temperatures.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 6(a) is a plan view of an embodiment in accordance with the present invention and FIG. 6(b) is an enlarged view of circle "F" in FIG. 6(a).

DETAILED DESCRIPTION

The present invention is directed to a scrubber. Such scrubber can be used to remove light scuff marks from surfaces as well as for washing dishes and scrubbing countertops to remove larger deposits. In other words, the present invention is a "scrubbing eraser" which has the properties of both a scrubber and an eraser. Moreover, the scrubber has a high cohesive strength and is resistant to rubbing against rough surfaces, enhancing its longevity and decreasing the residue it leaves on surfaces after scrubbing. Additionally, the present invention is directed to method of manufacturing the scrubber.

Referring now to the drawings in detail wherein like reference numerals have been used throughout the various figures to designate like elements, there is shown in FIGS. 1-6 a scrubber constructed in accordance with the principles of the present invention.

Figure 1:
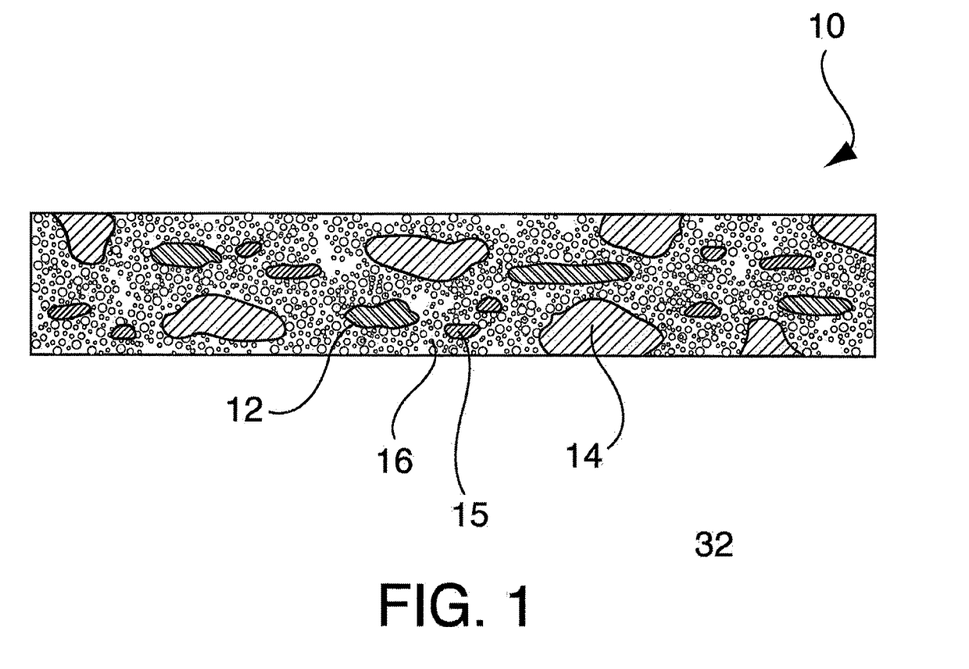
FIG. 1 is a side view of an embodiment in accordance with the present invention.

In an aspect of the invention, FIG. 1 shows a scrubber 10. Scrubber 10 includes foamed melamine resin and foamed rigid polyurethane resin and a foamed non-rigid polyurethane resin, and a binder. The foamed rigid polyurethane resin and the foamed non-rigid polyurethane resin can be open-celled or closed-celled, preferably open-celled. The foamed melamine resin (otherwise referred to as melamine-based resin) may be melamine-formaldehyde resin. US Patent Application Publication Number 2015/0037564 ('564 publication) describes an example of a melamine-formaldehyde resin and the disclosure of the '564 publication is incorporated by reference herein in its entirety for all purposes. The rigid foamed polyurethane resin may be a polyether polyol such as polyester urethane resin and the non-rigid polyurethane resin may be a polyether polyol such as a polyester urethane resin, and the binder may be a urethane binder. The rigid foamed polyurethane may be a prepolymer foam or a fully cured foam and the non-rigid foamed polyurethane may be a prepolymer foam or a fully cured foam, and the urethane binder may be a combination of MDI (methylene diphenyl diisocyanate) and polyether polyol (such as polyester polyol) or just MDI in liquid or solid form. The terms "rigid" and "non-rigid" in reference to the polyurethanes are utilized since one of the polyurethanes is foamed at a higher density than the other and has higher rigidity.

The scrubber 10 preferably has an average density of 0.010-0.5 grams per cm3, or any range within this range such as 0.02 to 0.5 grams per cm³, or 0.030-0.300 grams per cubic centimeter, or 0.050-0.250 grams per cm³, or 0.075-0.200 grams per cm³, or 0.090-0.150 grams per cm³, or 0.100-0.145 grams per cm³. Density that is higher may result in the product being too stiff and lower density may result in the product not having sufficient cohesive strength.

The foamed melamine resin and the non-rigid and rigid foamed polyurethane resins are preferably in the form of particles 12, 14, 15, and are joined at least in part by binder 16. For clarity, FIG. 1 shows only some of the melamine resin particles 12 and the rigid polyurethane resin particles 15, and the non-rigid polyurethane resin particles 14, and the particles 12, 14, and 15 are not necessarily drawn to scale. The amount of melamine-based resin may be 5-25% by weight of the scrubber, or any sub-range within this range, such as 10-17% or such as 11-15%. The amount of rigid polyurethane resin may be 5-25% by weight of the scrubber, or any sub-range within this range, such as 10-17%, or such as 11-15%. The non-rigid polyurethane resin may be 15-70% by weight of the scrubber, or any sub-range within this range such as 25-40%, or such as 30-35%. The binder 16 may be 20-60% by weight of the scrubber, or any sub-range within this range such as 30-50%, or such as 35-45%.

In the present invention, the various foam particles have two different densities, the Initial Density, and the Final Density. The Initial Density is the density of the particles prior to being compacted during formation of the scrubber 10. The melamine resin foam particles 12 that are used to make scrubber 10 may have an Initial Density of 0.002-0.030 grams per cm³ or any range within this range, such as 0.003-0.015 grams per cm³. Once the scrubber 10 is formed, the melamine resin foam particles 12 are compacted to a size which is 90% to 10% of its original size, and the density increases such that the Final Density is 110%-1000% relative to its Initial Density so that the Final Density is, for example, 0.0022-0.300 grams per cm³ and any range within this range such as 0.007-0.120 grams per cm³.

The non-rigid polyurethane foam particles 14 that are used to make scrubber 10 have an Initial Density of 0.01 to 0.07 grams per cm³ or any range within this range, such as 0.02-0.05 grams per cm³, or 0.02 to 0.04 g/cm³ prior to the formation of the scrubber 10. Once the scrubber 10 is formed, the non-rigid polyurethane foam particles 14 are compacted to a size which has a Final Density which is 110% to 1000% of the Initial Density so that it is, for example, a Final Density of 0.011 to 0.7 grams per cm³ and any range within this range such as 0.013 to 0.5 grams per cm³.

The rigid polyurethane foam particles 15 that are used to make scrubber 10 may have an Initial Density of 0.016 to 0.09 grams per cm³ or any range within this range, such as 0.02-0.06 g/cm³, or 0.03 to 0.06 g/cm³, or 0.02-0.05 grams per cm³. Once the scrubber 10 is formed, the rigid polyurethane foam particles 15 are compacted to a size which is 90% to 10% of their original size, and the density increases such that the Final Density is 110%-1000% relative to its Initial Density so that it is, for example, 0.018-0.9 grams per cm³ and any range within this range such as 0.022-0.5 grams per cm³.

The rigid polyurethane resin particles 15 have a rigidity which is 10% to 300% more than the non-rigid polyurethane particles 14, and any range within this range, such as 50% to 230% more rigidity, or 75% to 150% more rigidity. The rigid polyurethane foam particles 15 of the scrubber 10 may have a higher stiffness than the non-rigid foamed polyurethane resin 14 and the foamed melamine resin 12. For example, the rigid foamed polyurethane resin may have a stiffness which is 10% to 500% higher than the stiffness of the non-rigid foamed polyurethane resin 14 and the foamed melamine resin 12, such as 50% to 300%, and 100% to 200%, and any range within the range of 10% to 500%.

The rigid foamed polyurethane resin 15 may have a higher tensile strength (both Initial Tensile Strength before compaction and Final Tensile Strength after compaction) than the non-rigid foamed polyurethane resin 14 and the foamed melamine resin 12. For example, the rigid foamed polyurethane resin 15 may have an Initial Tensile Strength as well as a Final Tensile Strength, respectively, which is 10% to 500% higher than the Initial Tensile Strength and the Final Tensile Strength, respectively, of the non-rigid foamed polyurethane resin 14 and the foamed melamine resin 12, such as 50% to 300%, and 100% to 200%, and any range within the range of 10% to 500%. Preferably, the non-rigid foamed polyurethane resin 14 has an Initial Tensile Strength of 5-50 psi, such as 18-40 psi or even 10-20 psi before compaction, and a Final Tensile Strength of 10-300 psi after compaction. Preferably, the rigid foamed polyurethane resin has an Initial Tensile Strength of 10-150 psi before compaction or any range within this range such as 22-40 psi, or even 25-35 psi and a Final Tensile Strength of 20-600 psi after compaction, and any range within this range such as 5-30 psi. The tensile strength of the non-rigid foamed polyurethane and the rigid foamed polyurethane is determined pursuant to ASTM D 3574.

Additionally, rigid foamed polyurethane resin 15 may have fewer cells per unit volume than the non-rigid foamed polyurethane resin 14. For example, the non-rigid foamed polyurethane resin 14 may have between 10% and 1000% more cells per unit volume than the rigid foamed polyurethane resin 15, such as 50% to 500%, and 100% to 200%, and any range within 10% to 1000%. Preferably, the non-rigid foamed polyurethane resin 14 has an Initial Cell Count (i.e., before compaction) of 30-80 cells per cubic inch. The Final Cell Count (i.e., after compaction) of the non-rigid foamed resin is preferably 50-500 cells/in$^3$. Also preferably, the rigid foamed polyurethane resin has an Initial Cell Count of 4-40 or even 4-25 cells per cubic inch. The rigid foamed polyurethane resin has a Final Cell Count of 6-200 cells/in$^3$.

One aspect of the present invention is that the scrubber 10 exhibits the properties of both a scrubber and an eraser since the scrubber can be used to "scrub" clean large deposits and to "erase" or remove lights scuffs. This is very useful since it avoids having two objects to do this since one object is able to do both. Such a scrubber 10 includes the melamine resin 12, the non-rigid foamed polyurethane resin 14, and the rigid foamed polyurethane resin 15 and a binder 16.

The scrubber 10 as a whole may have a tensile strength ranging from 10-35 psi or any range within this range, such as 15-22 psi. The methodology for determining the tensile strength of the scrubber 10 is to use a constant-rate-of-extension (CRE) tensile-testing machine (Instron) to pull the scrubber 10 to failure at a rate of 0.5 inches per second, and record the maximum force.

The scrubber 10 may also have high durability during use such as a percent loss of 0.1 to 1.5% after 100 cycles of abrasion on a Garner abrasion tester, and preferably 0.3-0.7%. Prior to cycling, the scrubber 10 is weighed and saturated with water, then squeezed by hand to remove excess. The cycling is done and the scrubber 10 is dried and weighed to determine amount of sponge material lost during abrasion.

Additionally, the scrubber 10 can have different rigidity at different temperatures since the melamine resin 12 has a different rigidity at different temperatures.

The non-rigid foamed polyurethane resin 14 preferably has an Initial Compression Force Deflection (i.e., prior to compaction) of 0.3 to 5.5 psi, such as 0.3 to 2 psi. After compaction, the non-rigid foamed polyurethane 14 preferably has a Final Compression Force Deflection of 1-15 psi. Preferably, the rigid foamed polyurethane resin 15 has an Initial Compression Forced Deflection of 1 to 10 psi such as 2-7 psi. The rigid foamed polyurethane resin 15 preferably has a Final Compression Force Deflection of 2-30 psi. The compression force deflection is measured according to ASTM D 3574. Compression force deflection is a measure of stiffness.

Preferably, the non-rigid foamed polyurethane 14 has an elongation of 80-150%. Also, preferably, the rigid foamed polyurethane 15 has an elongation of 20-80%. The elongation % is determined in accordance with ASTM D 3574.

The average particle size of the melamine-based resin particles 12 may be 1-20 millimeters, or any sub-range within this range, in the final product which is the scrubber 10. The final product is produced after compaction. The average particle size of the rigid polyurethane resin particles 15 may be 0.1-15 millimeters, or any sub-range within this range, in the final product which is the scrubber 10. The average particle size of the non-rigid polyurethane resin particles 14 may be 0.1-15 millimeters, or any sub-range within this range, in the final product which is the scrubber 10. The average aspect ratio of the melamine-based resin particles 12 may be in a range from 1:1 to 5:1 or any sub-range within this range, in the final product scrubber 10. The average aspect ratio of the rigid polyurethane resin particles 15 may be in a range from 1:1 to 5:1 or any sub-range within this range, in the final product which is the scrubber 10. The average aspect ratio of the non-rigid polyurethane resin particles 14 may be in a range from 1:1 to 5:1 or any sub-range within this range, in the final product which is the scrubber 10. The particle size as defined in this application is the volume-based particle size, which is the diameter of a sphere that has the same volume as the given particle. In other words, particle size=$D=2*((3V/4\pi)^{1/3})$, where D is the diameter of the representative sphere and V is the volume of the particle. The aspect ratio is defined as the ratio of the longest dimension to the shortest dimension so 5:1 means the longest dimension is five times the length of the shortest dimension of a particle. The particle sizes of the resin particles prior to compression into the final product scrubber 10 are between 1.1 times and 10 times larger (and any range within this range) than the particle sizes in the product scrubber 10.

Preferably, the average particle size of the melamine-based resin particles 12 is larger than the average particle size of the rigid and non-rigid polyurethane resin particles 15 and 14 in the final product. For example, the melamine based resin particles 12 may be, on average, between 25% and 300% (or any sub-range within this range) larger than the polyurethane resin particles 14 and 15. This is important since the melamine based resin particles 12 allow the removal of fine deposits (e.g., scuff marks from a wall) and if the polyurethane resin particles 14 and 15 are too large, this may detract from the ability to remove fine deposits since the polyurethane resin particles 14 and 15 are better at removing larger deposits (e.g., a glob of dirt from the floor). The combination of melamine particles and polyurethane particles synergistically result in a scrubber which can remove both small deposits such as scuff marks, as well as larger deposits such as dirt or grime or residual food in dishes, while having great cohesive strength and longevity even in the event that it is used to scrub rough surfaces.

Figure 2:
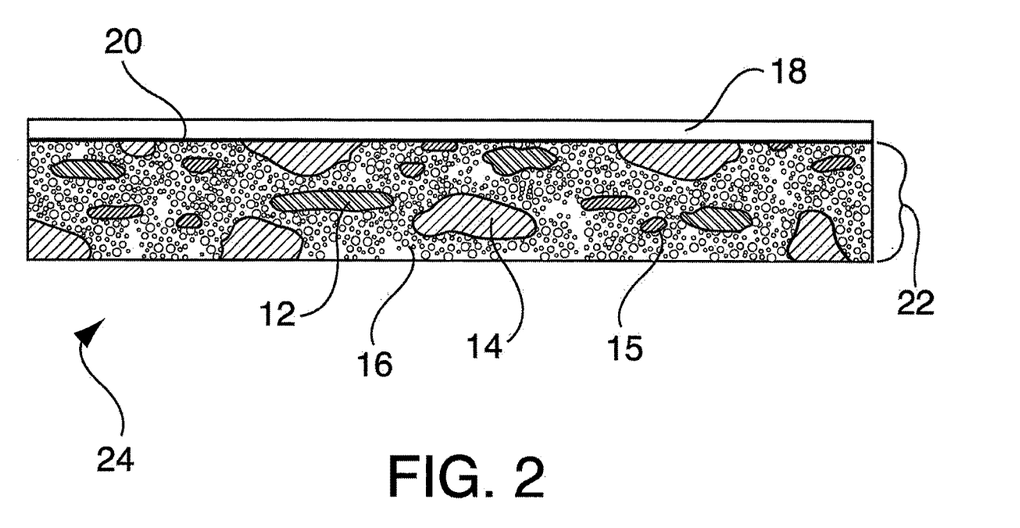
FIG. 2 is a side view of an embodiment in accordance with the present invention.

FIG. 2 shows another embodiment of the present invention. The scrubber 24 as shown in FIG. 2 includes a polyurethane foam laminate 18. The polyurethane foam laminate 18 is laminated to the base scrubber 22 via an adhesive 20. Base scrubber 22 may be identical to the scrubber 10 shown in FIG. 1. The inclusion of the laminate 18 provides more sturdiness to the product and a surface which excels at removing larger deposits. The laminate 18 may be made of the rigid polyurethane resin particles 15 or the non-rigid polyurethane resin particles 14 or a combination of both, and may also include binder 16. The laminate 18 preferably does not include any melamine-based particles 12.

In another embodiment, the scrubbers 10, 24 may comprise a liquid surfactant on the inside. Preferably, at least some of the foams which compose scrubbers 10, 24 are open-celled and, therefore, if a surfactant is included inside the scrubbers 10, 24, the surfactant may leach out of the scrubbers 10, 24 when contacted with water and the surfactant may be helpful as a cleaning aid. The liquid surfactant may be soap.

The melamine-based particles 12 and the polyurethane-based particles 14 and 15 are preferably evenly distributed in the scrubber 10. For example, they may be distributed in scrubber 10 in such a way that the relative particles per unit area of the melamine-based particles 12 versus the polyurethane particles 14 and 15 does not vary by more than twenty five percent from a first volume to a second volume of scrubber 10, where the first volume is twenty five percent of scrubber 10 and the second volume comprises a different twenty five percent of the scrubber 10. In other words, if scrubber 10 is divided up into four equal quadrants, no quadrant will have a relative distribution of melamine-based particles 12 versus polyurethane particles 14 and 15 which varies by more than twenty five percent relative to any quadrant. The even distribution is important in that a distribution which is too heterogeneous may reduce the ability to remove either fine deposits or larger deposits, as well as potentially adversely affecting cohesive strength. Base scrubber 22 can also have the same features of distribution as scrubber 10 as explained above. As a result of this even distribution, the scrubber 10 and base scrubber 22 can have the ability to both remove minor deposits such as scuffs as well as larger deposits such as food from dishes while maintaining significant cohesive strength and longevity.

The present invention is also directed towards the manufacturing of the scrubbers 10, 24 of the present invention. This method may include mixing particles of foamed melamine-based resin 12 and particles of non-rigid and rigid foamed polyurethane resins 14 and 15 to form a first mixture and mixing the first mixture with a binder 16 to form a second mixture. Preferably, the addition of the binder into the first mixture is done slowly or in a plurality of batch stages (i.e., the first third is mixed, then the second third is mixed, then the third is mixed) in order to achieve a more homogeneous distribution of foamed particles. As stated above, the foamed melamine resin 12 may be melamine formaldehyde resin and the rigid foamed polyurethane resin 15 may be polyester urethane resin and the non-rigid foamed polyurethane resin 14 may be polyester urethane resin and the binder 16 may be a urethane binder. Also as stated above, the foamed polyurethanes 14 and 15 may be a prepolymer foam or fully cured foam and the urethane binder may be a combination of MDI and polyether polyol or just MDI.

The method of manufacturing the scrubber 10, 24 of the present invention may also include compressing the second mixture to achieve an average density of 0.010-0.5 grams per $cm^3$, or any range within this range such as 0.01 to 0.5 grams per $cm^3$, or 0.030-0.300 grams per $cm^3$, or 0.050- 0.250 grams per $cm^3$, or 0.075-0.200 grams per $cm^3$, or 0.090-0.150 grams per $cm^3$, or 0.100-0.145 grams per $cm^3$.

The method of manufacturing the scrubber 24 of the present invention also includes laminating a polyurethane foam laminate 18 to the base 22. The polyurethane foam laminate 18 is preferably laminated to the base 22 via an adhesive 20. Such adhesive can be the same or different as binder 16.

In another embodiment, the method of manufacture of the present invention includes injecting a liquid surfactant into the scrubber 10, 24. In the case of scrubber 24, the liquid surfactant is preferably injected into the base 22 though it can be injected into the laminate 18 and/or the base scrubber 22. As stated above, the liquid surfactant may be a soap.

Figure 3:
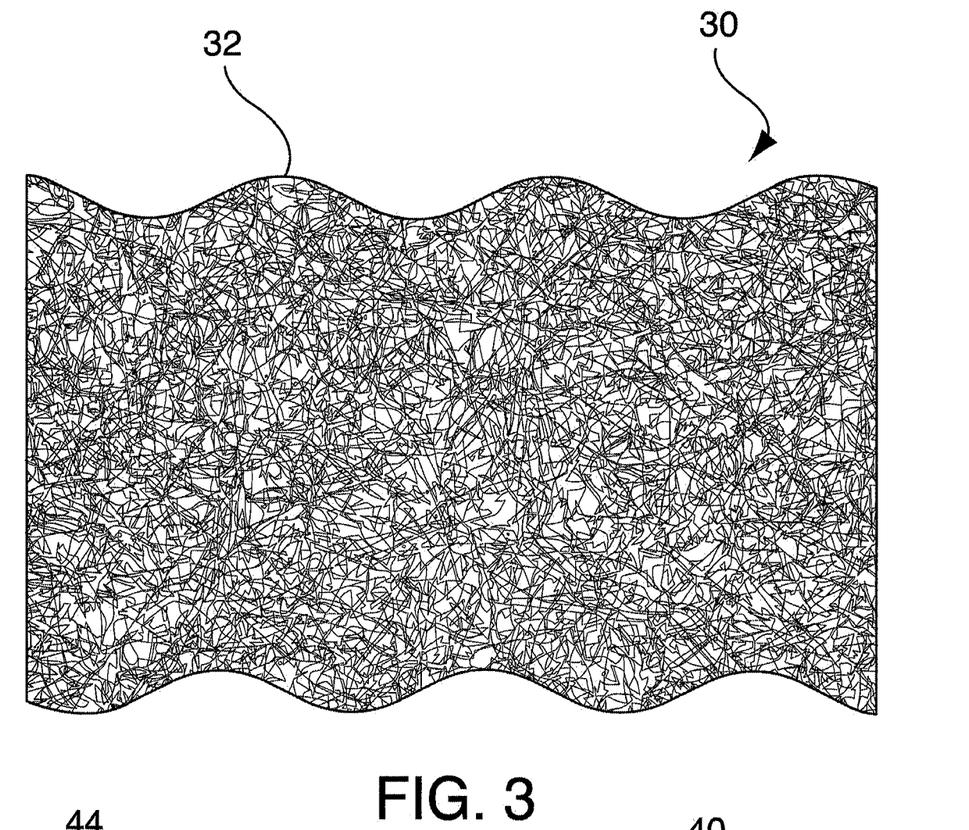
FIG. 3 is a plan view of an embodiment in accordance with the present invention.

FIG. 3 shows a plan view of scrubber 30. Scrubber 30 can include the same components and compositions as scrubber 10 or the same components and compositions as scrubber 24. Scrubber 30 can be identical to scrubber 10 or scrubber 24. Scrubber 30 shows undulations 32 which are designed as a way for the scrubber 30 to be gripped by a person who will hold the scrubber 30 by putting at least some fingers on the undulations 32.

Figure 4:
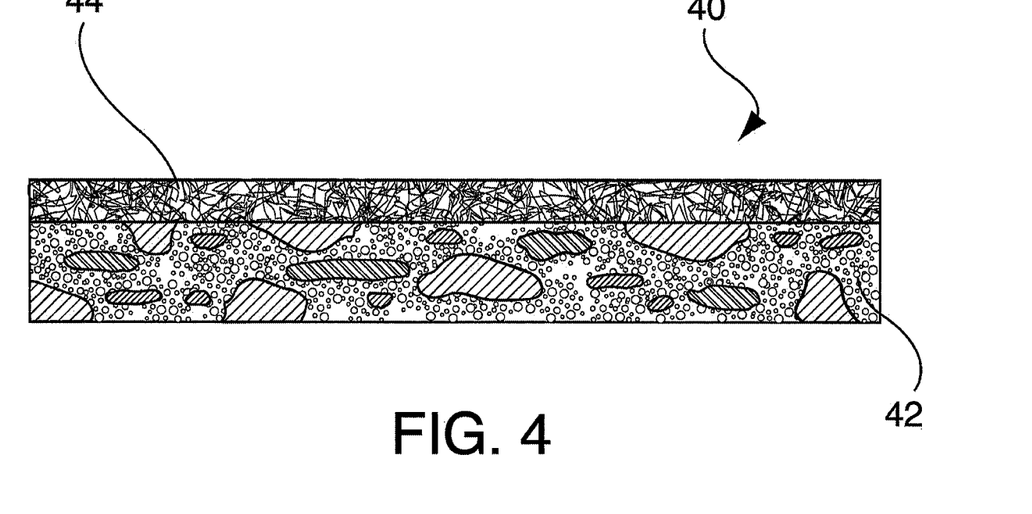
FIG. 4 is a side view of an embodiment in accordance with the present invention.

FIG. 4 shows a side view of scrubber 40. Scrubber 40 includes a base scrubber 42 and a laminate 44. Base scrubber 42 can include the same components and compositions as base scrubber 22 and laminate 44 can include the same components and compositions as laminate 18. Base scrubber 42 can be identical to base scrubber 22 and laminate 44 can be identical to laminate 18.

Figures 5, 6:
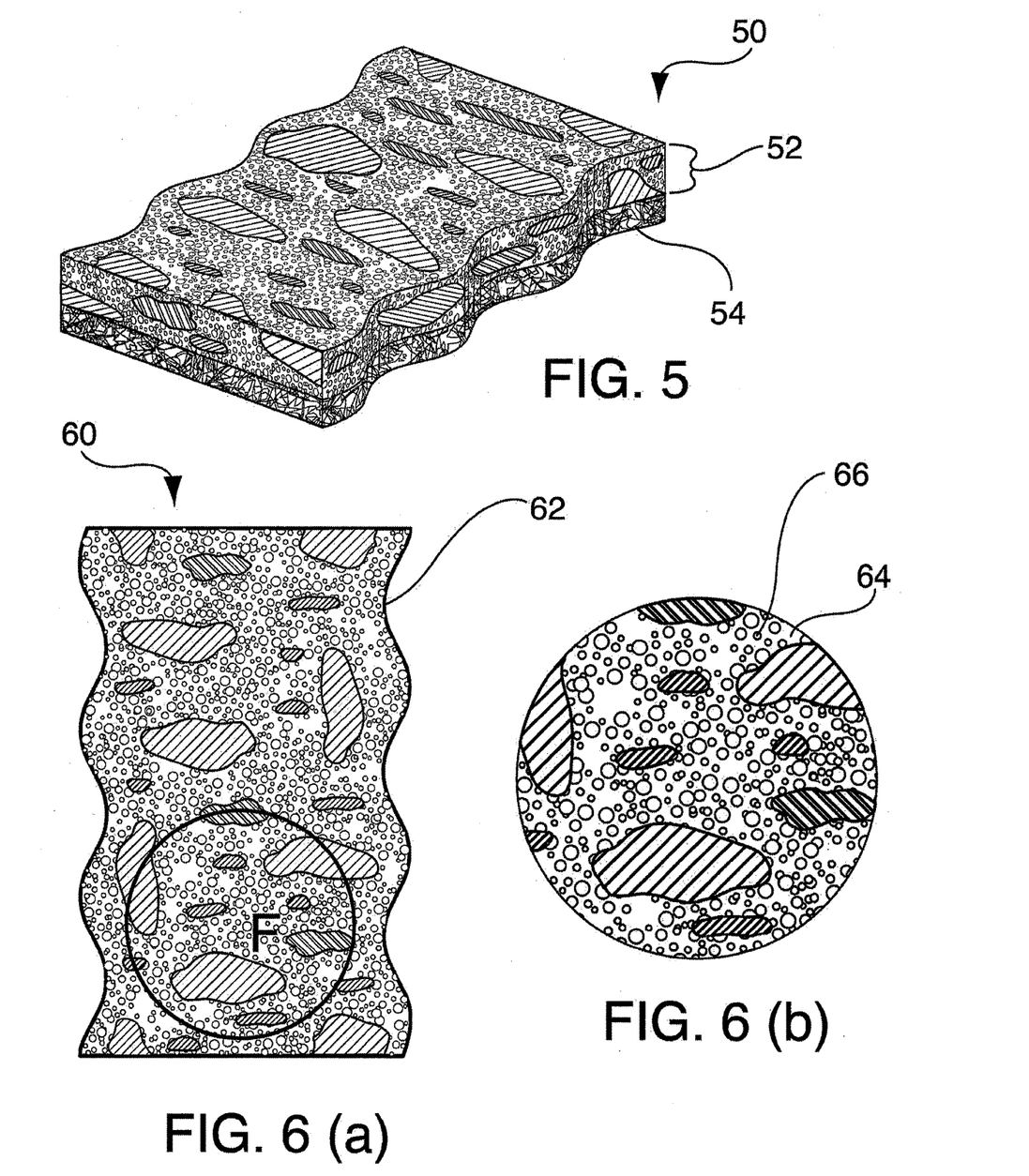
FIG. 5 is a perspective view of an embodiment in accordance with the present invention.

FIG. 5 shows a bottom front perspective view of scrubber 50. Scrubber 50 includes a base scrubber 52 and a laminate 54. Base scrubber 52 can include the same components and compositions as base scrubber 22 and laminate 54 can include the same components and compositions as laminate 18. Base scrubber 52 can be identical to base scrubber 22 and laminate 54 can be identical to laminate 18.

FIG. 6(a) shows a plan bottom view of scrubber 60. Scrubber 60 includes structure 62. Structure 62 can be a structure which has the same components and compositions as base scrubber 22 or which is identical to base scrubber 22. Scrubber 60 may or may not include a laminate. If scrubber 60 includes a laminate on the other side of structure 62, such laminate could have the same components and compositions as laminate 18 and can be identical to laminate 18.

FIG. 6(b) shows an enlarged view of circle F in FIG. 6(a), including binder 64 and melamine-based resin 66. Binder 64 can be the same as binder 16 at FIG. 1 and melamine resin 66 can be the same as melamine resin 12 at FIG. 1.

Examples 1-2 and Comparative Examples 3-12

Scrubbers in accordance with the present invention were formed by using foamed melamine resin particles, rigid foamed polyurethane resin particles, non-rigid foamed polyurethan resin particles, and a binder. Such scrubbers were compared with 5 competitive scrubbers in the characteristics of tensile strength in lbf (pound-force) (using a constant-rate-of-extension (CRE) tensile-testing machine (Instron brand) to pull the sponge to failure at a rate of approximately 0.5 inches per second, and recorded the maximum force), and durability (% loss after 100 cycles on the abrasion tester (Gardner brand)). Below is a table which shows the results of such testing in which the present invention had much higher tensile strength and much lower % loss than competitive scrubbers. In fact, as the Examples show in the table below, the durability of the scrubber of the present invention is at least three times better than the durability of the five other competitive scrubbers tested.

| Characteristic | Present Invention-Examples 1-2 | Competitive Scrubber #1-Comparative Examples 3-4 | Competitive Scrubber #2-Comparative Examples 5-6 | Competitive Scrubber #3-Comparative Examples 7-8 | Competitive Scrubber #4-Comparative Examples 9-10 | Competitive Scrubber #5-Comparative Examples 11-12 |
|---|---|---|---|---|---|---|
| Tensile strength, lbf (pound-force) | 28.1 | 8.5 | 17.1 | 7.9 | 15.0 | 10.1 |
| Durability, % loss | 0.584 | 1.93 | 2.65 | 6.87 | 3.87 | 7.55 |

What is claimed:

1. A scrubber comprising:
   foamed melamine resin particles,
   first foamed polyurethane resin particles, wherein the first foamed polyurethane resin particles are non-rigid,
   second foamed polyurethane resin particles, wherein the second foamed polyurethane resin particles are rigid, and
   a binder,
   wherein an amount of the foamed melamine resin particles is 5-25% by weight of the scrubber, an amount of the first foamed polyurethane resin particles is 15-70% by weight of the scrubber, an amount of the second foamed polyurethane resin particles is 5-25% by weight of the scrubber, and an amount of the binder is 20-60% by weight of the scrubber, and
   wherein the second foamed polyurethane resin particles have a stiffness which is 10% to 500% higher than the stiffness of the first foamed polyurethane resin particles and the foamed melamine resin particles.

2. The scrubber according to claim 1, wherein the foamed melamine resin particles comprise melamine formaldehyde resin and wherein the first foamed polyurethane resin particles are polyester urethane resin particles and the second foamed polyurethane resin particles are polyester urethane resin particles and the binder is a urethane binder.

3. The scrubber according to claim 2, wherein the urethane binder is methylene diphenyl diisocyanate or methylene diphenyl diisocyanate in combination with a polyester polyol.

4. The scrubber according to claim 1, wherein the scrubber has an average density of 0.01-0.5 g/cm$^3$.

5. The scrubber according to claim 1, wherein an average particle size of the foamed melamine resin particles is 1-20 millimeters, an average particle size of the second foamed polyurethane resin particles is 0.1-15 millimeters, and an average particle size of the first foamed polyurethane resin particles is 0.1-15 millimeters.

6. The scrubber according to claim 1, wherein an average aspect ratio of the foamed melamine resin particles, the first foamed polyurethane resin particles, and the second foamed polyurethane resin particles is in a range from 1:1 to 5:1.

7. The scrubber according to claim 1, further comprising a polyurethane foam laminate.

8. The scrubber according to claim 7, wherein the polyurethane foam laminate comprises the same resins as at least one of the first foamed polyurethane resin particles or the second foamed polyurethane resin particles.

9. The scrubber according to claim 1, wherein the foamed melamine resin particles, the first foamed polyurethane resin particles, and the second foamed polyurethane resin particles are distributed in the scrubber in such a way that the relative particles per unit area of each of the foamed melamine resin particles, the first foamed polyurethane resin particles, and the second foamed polyurethane resin particles does not vary by more than twenty five percent from a first volume to a second volume of the scrubber, wherein the first volume comprises twenty five percent of the scrubber and the second volume comprises a different twenty five percent of the scrubber.

10. A scrubber configured to exhibit the properties of both a scrubber and an eraser, the scrubber comprising:
    foamed melamine resin particles,
    first foamed polyurethane resin particles, wherein the first foamed polyurethane resin particles are non-rigid,
    second foamed polyurethane resin particles, wherein the second foamed polyurethane resin particles are rigid, and
    a binder,
    wherein the scrubber has a density ranging from 0.01 to 0.5 grams per cm$^3$,
    wherein an amount of the foamed melamine resin particles is 5-25% by weight of the scrubber, an amount of the first foamed polyurethane resin particles is 15-70% by weight of the scrubber, an amount of the second foamed polyurethane resin particles is 5-25% by weight of the scrubber, and an amount of the binder is 20-60% by weight of the scrubber, and
    wherein the second foamed polyurethane resin particles have a stiffness which is 10% to 500% higher than the stiffness of the first foamed polyurethane resin particles and the foamed melamine resin particles.

11. The scrubber according to claim 10, wherein the scrubber has a tensile strength ranging from 10-35 psi.

12. The scrubber according to claim 10, wherein the foamed melamine resin particles have a different rigidity at different temperatures.

13. A method of forming a scrubber, comprising:
    mixing foamed melamine resin particles, first foamed polyurethane resin particles, and second foamed polyurethane resin particles to form a first mixture, wherein the first foamed polyurethane resin particles are non-rigid, wherein the second foamed polyurethane resin particles are rigid; and
    mixing the first mixture with a binder to form a second mixture,
    wherein an amount of the foamed melamine resin particles is 5-25% by weight of the scrubber, an amount of the first foamed polyurethane resin particles is 15-70% by weight of the scrubber, an amount of the second foamed polyurethane resin particles is 5-25% by weight of the scrubber, and an amount of the binder is 20-60% by weight of the scrubber, and
    wherein the second foamed polyurethane resin particles have a stiffness which is 10% to 500% higher than the stiffness of the first foamed polyurethane resin particles and the foamed melamine resin particles.

14. The method according to claim 13, further comprising compressing the second mixture to achieve an average density of 0.01-0.5 grams/cm³.

15. The method according to claim 14, wherein an average particle size of the melamine based resin particles is 1-20 millimeters, an average particle size of the second polyurethane resin particles is 0.1-15 millimeters, and an average particle size of the first polyurethane resin particles is 0.1-15 millimeters.

16. The method according to claim 14, wherein an average aspect ratio of the foamed melamine resin particles, the first foamed polyurethane resin particles, and the second foamed polyurethane resin particles is in a range from 1:1 to 5:1.

\* \* \* \* \*